(12) United States Patent
Watte

(10) Patent No.: US 8,082,133 B2
(45) Date of Patent: Dec. 20, 2011

(54) TERRAIN PAGING DURING A DISTRIBUTED SIMULATION INVOLVING MULTIPLE OBJECTS

(75) Inventor: Jon E. Watte, Redwood City, CA (US)

(73) Assignee: Science Applications International Corporation, San Diego, CA (US)

(*) Notice: Subject to any disclaimer, the term of this patent is extended or adjusted under 35 U.S.C. 154(b) by 882 days.

(21) Appl. No.: 12/124,907

(22) Filed: May 21, 2008

(65) Prior Publication Data

US 2009/0292513 A1 Nov. 26, 2009

(51) Int. Cl.
G06G 7/48 (2006.01)
(52) U.S. Cl. .......................................... 703/6; 709/203
(58) Field of Classification Search .......... 703/6; 463/1, 463/6, 30, 31, 32, 33, 42; 345/419, 557; 434/43, 44

See application file for complete search history.

(56) References Cited

U.S. PATENT DOCUMENTS

| | | | |
|---|---|---|---|
| 6,747,649 B1 * | 6/2004 | Sanz-Pastor et al. | 345/428 |
| 6,922,703 B1 * | 7/2005 | Snyder et al. | 345/633 |
| 7,002,571 B2 | 2/2006 | Lake et al. | |
| 7,436,405 B2 * | 10/2008 | Losasso Petterson et al. | 345/428 |
| 2008/0098064 A1 * | 4/2008 | Sherinian | 709/203 |

OTHER PUBLICATIONS

Scott Bilas, "The Continuous World of Dungeon Siege", 2003, retrieved on May 23, 2011 from www.floatingorigin.com.*
Jaeheon Jeong et al., "Cost-Sensitive Cache Replacement Algorithms", 2002, IEEE, pp. 1-11.*
Mayo et al, "Massively Multi-Player (MMP) Environments for Asymmetric Warfare", JDMS, vol. 3, Issue 3, Jul. 2006, pp. 155-166.*
Lindstrom et al, "An Integrated Global GIS and Visual Simulation System", Technical Report GIT-GVU-97-07, Georgia Inst. of Technology, Mar. 1997.*
Ulrich, T., "Spatial partitioning with 'Loose' octrees," emails & postings, http://www.tulrich.com/geekstuff/partitioning.html, May 15, 2008.
Haines, E., "Light Makes Right," Ray Tracing News, 1:2 (1988) http://tog.acm.org/resources/RTNews/html/rtnews1b.html, May 15, 2008.

* cited by examiner

Primary Examiner — Mary C Jacob
(74) Attorney, Agent, or Firm — King & Spalding LLP

(57) ABSTRACT

A technique is described for managing loading of terrain data into working memory of a computer during a distributed simulation, in which multiple computer systems operated by multiple users participate, where the simulation involves multiple user-controlled objects simulated with a terrain database that is too large to fit in working memory of the computer system. The technique includes calculating an area of interest around each of the objects to be simulated, and then simulating the objects by loading into working memory the terrain pages of the terrain database that overlap with at least one of the areas of interest, and generally not loading into working memory terrain pages of the terrain database that do not overlap with at least one of the areas of interest. As such, at any given time, any given server can have loaded in working memory fewer than all of the pages of the terrain database.

15 Claims, 12 Drawing Sheets

TERRAIN PAGING DURING A DISTRIBUTED SIMULATION INVOLVING MULTIPLE OBJECTS

FIELD OF THE INVENTION

At least one embodiment of the present invention pertains to computer simulation in a network environment, and more particularly, to a technique for terrain paging during a distributed simulation involving multiple objects.

BACKGROUND

A "terrain database" is a set of data which allows a simulation or a visualization to understand, at a computational geometry level, the ground, roads, buildings, vegetation and other static elements of a simulated world. Terrain databases are typically large, which means that they take time to load from external storage (e.g., hard disk, optical disk, network storage) into working memory, where the data can be used for simulation computation. The "working memory" of a computer, as the term is used herein, is the memory from which executable instructions are normally executed by the computer and/or where operands and other data and results of executing the instructions are normally stored for purposes of execution. Traditionally, working memory is implemented as random access memory (RAM), although that does not have to be the case.

Examples of terrain databases include game levels (such as an industrial complex, simulated city or enchanted forest) as well as real-world data (ranging from a single building, for example, up to the entire world and even space).

Applications that use terrain databases include simulation based applications, such as massively multiplayer online gaming and three-dimensional (3D) virtual worlds. These two types of applications commonly involve multiple human users using separate computer systems on a large-scale computer network, such as the Internet, to participate in a simulation. Normally at least one computer maintains the state of various simulation objects that can be displayed on a display device, such as a computer monitor. The objects may represent real-world objects, such as people, animals, vehicles, structures, etc., at least some of which may be controlled by human users. The state of an object can include the object's display position on a display device, its physical orientation, size, shape, color, as well as attributes that may not be visible or perceivable to a human user.

In traditional simulations and computer games, the entirety of a terrain database is loaded at once into the working memory of a computer executing the simulation or game. This lets any action within the world have immediate access to the data, but limits the overall size of the terrain database used for simulation. Examples of this approach can be seen as "levels" within a computer game. Two drawbacks of this approach are that each level takes a while to load (leaving the user waiting), and events that cover a large area cannot be simulated in real time.

In modern computer games, the terrain database may be so large that it cannot fit in its entirety into the working memory of a computer that executes the game. Consequently, a method known as "streaming" is sometimes applied, where the player (or virtual camera) can move around large areas, and in the context of simulation, at some limited velocity. The terrain database is broken into many smaller pieces. The pieces that overlap some neighboring area to the player or camera location are loaded into memory, whereas other pieces are unloaded. This loading and unloading at the boundary of the visible area typically runs asynchronously in the background, and with a known loading speed from the storage medium, a defined experience can be provided.

This "streaming" technique lets a single viewpoint move around the virtual world, at a limited velocity, letting the user partake of a large terrain database without any noticeable loading delays. However, as only a small area of the world, directly surrounding the user or camera location, is loaded at any one time, any simulated action in another part of the world must be paused during the times that those parts are not loaded. Yet pausing simulation of one or more objects may be unacceptable for certain applications, particularly multi-user, multi-object distributed simulations or games. Hence, with traditional methods of streaming, a server executing a simulation that includes multiple user-controlled simulated objects cannot stream out of a terrain database, because there is no single point of focus.

In modern massively multi-player games, the concept of streaming on the client is often combined with the concept of separating load geographically onto different server computers. Each server is designated a specific area of the virtual world and loads all the terrain data for that area. When a player comes within the zone served by that server, simulation authority for the player is moved onto that server, from whatever server previously was simulating the player (or his avatar). This approach allows a distributed server system to simulate a relatively large area with low latency (because each server preloads all of its terrain data), while letting the player have a seamless experience (due to client streaming). This approach is used in some of the most advanced simulation and gaming systems.

Note that the designers of many current distributed simulation systems, even massively multiplayer games, choose to avoid the complexity of distributed servers and streaming clients, and instead implement a one-to-one mapping between server area and client-side levels. In such systems, there are defined portals where the client will stop and load a new level (terrain database), and at the same time, simulation responsibility is handed over to a new server. Each server process then preloads its defined level, and nothing more. The system can therefore easily deliver a defined experience (measured in simulation capacity and latency) relating to terrain, since the amount of terrain data is static on both server and client. However, the area which can be simulated on any particular server is limited in size by the size of its working memory (e.g., RAM).

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
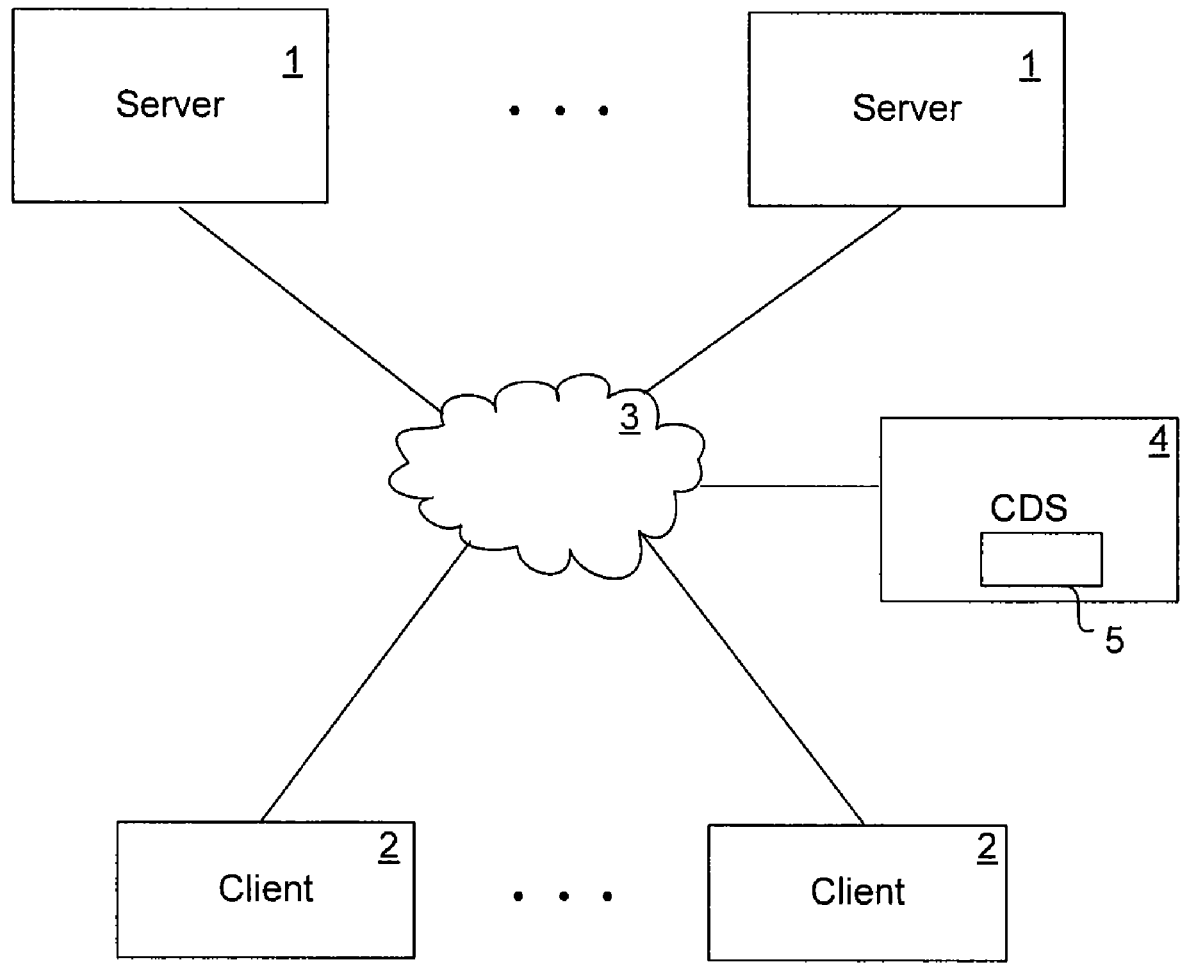
FIG. 1 illustrates a network environment in which a multi-user, multi-object simulation can be executed.

A technique for managing and dynamically loading multiple sections ("pages") of a terrain database in a way that is adaptive to load, on a server computer is introduced here. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Using the traditional methods of streaming, a server cannot stream out of a terrain database, because there is no single point of focus, i.e., there are multiple simulated objects that can change state during the course of the simulation. A server may have to serve any entity (object) that is within the server's area of interest. When using streaming terrain databases coupled with area-mapped servers, traditionally, each server has had to preload all of the terrain data for its assigned area into working memory, which (because of limited memory and processor resources) limits the total area for which a single server can be responsible.

The technique introduced here uses multiple centers of focus, each with its own requirements for responsiveness (latency) and entity movement speed. A "center of focus", as the term is used herein, is a simulated object which can change state during the course of a simulation, or another geographic area within a terrain database, that needs to be loaded for some reason pertaining to the simulation. As long as a simulated object is not allowed to move faster than its specified top speed, and as long as the underlying terrain database storage can deliver pages of terrain with a known maximum latency, a system using the technique introduced here can be assigned to serve a large area of the simulated world, but only actually load a subset (portion) of the terrain relating to its area of responsibility. Further, because the areas of interest are selected based on the entities currently being simulated, the server can guarantee that any simulated entity will always progress, and unlike client-side streaming, simulated entities do not ever have to be paused due to the terrain they need being unloaded from the system to conserve memory or processing resources.

Hence, the technique introduced here relates to a simulation executed on a computer system, where multiple computer systems operated by multiple users participate in the simulation over a network, and where the simulation involves multiple objects, at least some of which are user controlled, which are simulated in association with a terrain database that is too large to fit in working memory of the computer system. The technique includes calculating an area of interest around each of the objects to be simulated, and then simulating the objects by loading into working memory the terrain pages of the terrain database that overlap with at least one of the areas of interest, and generally, not loading into working memory terrain pages of the terrain database that do not overlap with at least one of the areas of interest. As such, any given server loads fewer than all of the pages of the terrain database at any given time.

Note that the terms "area" and "volume" are used interchangeably in this document, because while at least one embodiment implements the algorithm in 3D (using boxes, spheres, and other 3D volumes), the technique is easier to describe and visualize in two dimensions (2D), using rectangles, circles, and other 2D areas (rather than 3D volumes, etc.). Similarly, the simulation itself may be distributed across multiple simulation servers (for example, for entity count scalability purposes), and each simulation server can be responsible for a different area of the virtual world, and thus have different sets of objects for which to load terrain.

Note also that while the technique introduced here is particularly well-suited to large-scale, multi-user, multi-object simulations, any system that does simulation of geographically disparate entities can use this mechanism, even if the system has only a single user on a single hardware platform.

Further, note that "server" and "client" are network topology concepts as used herein, not necessarily hardware difference concepts. A "server", as the term is used herein, is a network node that receives control information originating from a plurality of human users, collates and processes this information, and distributes results of such processing to a plurality of human users. A "client", as the term is used herein, is a network node that receives direct control input by a human user, and forwards this information to one or more servers for redistribution to other human users. In some network topologies, a single node may be both "server" and "user" at the same time, as in a typical "user hosted" network topology. In some network topologies, all nodes may be servers, forwarding information to a majority of the other nodes, as in a typical peer-to-peer network topology.

Note that the technique introduced here is different from traditional large-scale visualization systems, such as Google Earth, in at least two respects. First, this technique includes simulation, which such visualization systems do not. Further, this technique uses multiple centers of focus, which such visualization systems do not.

The selection of the set of terrain pages to load does not need to be stringently confined to the area of interest of simulated objects, as long as the CPU and working memory budgets of the simulation system are not exceeded. A computer system can keep pages loaded longer than strictly necessary, for example, by using a least recently used (LRU) cache of currently not active pages that might soon become active again. The system can also speculatively preload terrain pages for various reasons, such as if some terrain pages contain features of special interest as separately identified, or if history of simulation indicate a likelihood that certain pages will soon become necessary.

FIG. 1 illustrates a network environment in which the technique introduced here can be implemented. The environment includes a number (N) of servers 1 which are coupled to a number (M) of clients 2 via a network 3. Also coupled to the network 3 is a content distribution server (CDS) 4. The CDS 4 stores a terrain database 5 which is used by the servers 1 and clients 2 during a simulation. Some or all of the terrain database 5 is distributed by the CDS 4 at various times to various ones of the servers 1 and/or clients 2. Note that FIG. 1 depicts a highly simplified system, to facilitate explanation. Although only two servers 1 and two clients 2 are shown, the actual number (M) of servers 1 and the actual number (N) of clients 2 are not limited in practice to any particular numbers.

In the context of this description, a client 2 is machine that is operated interactively by at least one human user and has a function of displaying information to a user using a display device. A server 1 is a machine that has a function of receiving requests and messages over a network, processing the requests and messages, and sending responses and other messages back out over the network. A server 1 does not necessarily have a display (if it does, the display is primarily used for management and status purposes).

Note that a given machine (e.g., network node) can operate as both a server 1 and a client 2 for purposes of executing a simulation. This scenario is commonly the case for user-hosted networked games. A node that acts as server then performs both the role of server (receiving, processing and sending network messages) and the role of client (receiving network messages, displaying the state of the simulation to a user, and interpreting and forwarding user commands). In some embodiments, most nodes on the network operate as both server and client. This scenario is common for peer-to-peer topology logical networks, where each node acts as server for some number of simulation entities, controlled by a human user at that node, but acts as a client for simulation entities controlled by other nodes.

Any of the servers 1, clients 2 and CDS 4 may be a conventional computer system, such as a personal computer (PC), server class computer, workstation, set-top box, console game system, hand-held computing/communication device such as a cellular phone, personal digital assistant (PDA), or the like. The network 3 may be a global internetwork such as the Internet, a campus intranet, a wide area network (WAN), a local area network (LAN), or any other type of network or combination of networks. The techniques introduced here can be applied to networks that use any of a variety of communication techniques, including datagram based networks (e.g., the Internet), connection based (e.g., X.25) networks, virtual circuit based (e.g., ATM) networks, etc.

During a simulation, each of the clients 2 maintains a set of in-memory objects, representing simulated real-world objects, some of which are controlled or heavily influenced by the human users of these machines. Each machine maintains the same objects, however, the states of the objects may be computed at different times on each machine. A server 1 maintains the "true" state of one or more of the objects, i.e., the state which is considered to be the correct state of the object. The clients 2 are used by human users who control certain ones of the objects. Note that in certain embodiments, one server may maintain the true state of one or more particular objects, while another server or servers maintain the true state of another object or objects or perform other server-centric functions. In addition, a server 1 may be implemented in the same machine as one or more clients 2. However, for purposes of describing the techniques introduced here, it is assumed that servers 1 and clients 2 are implemented in separate machines.

Figure 2:
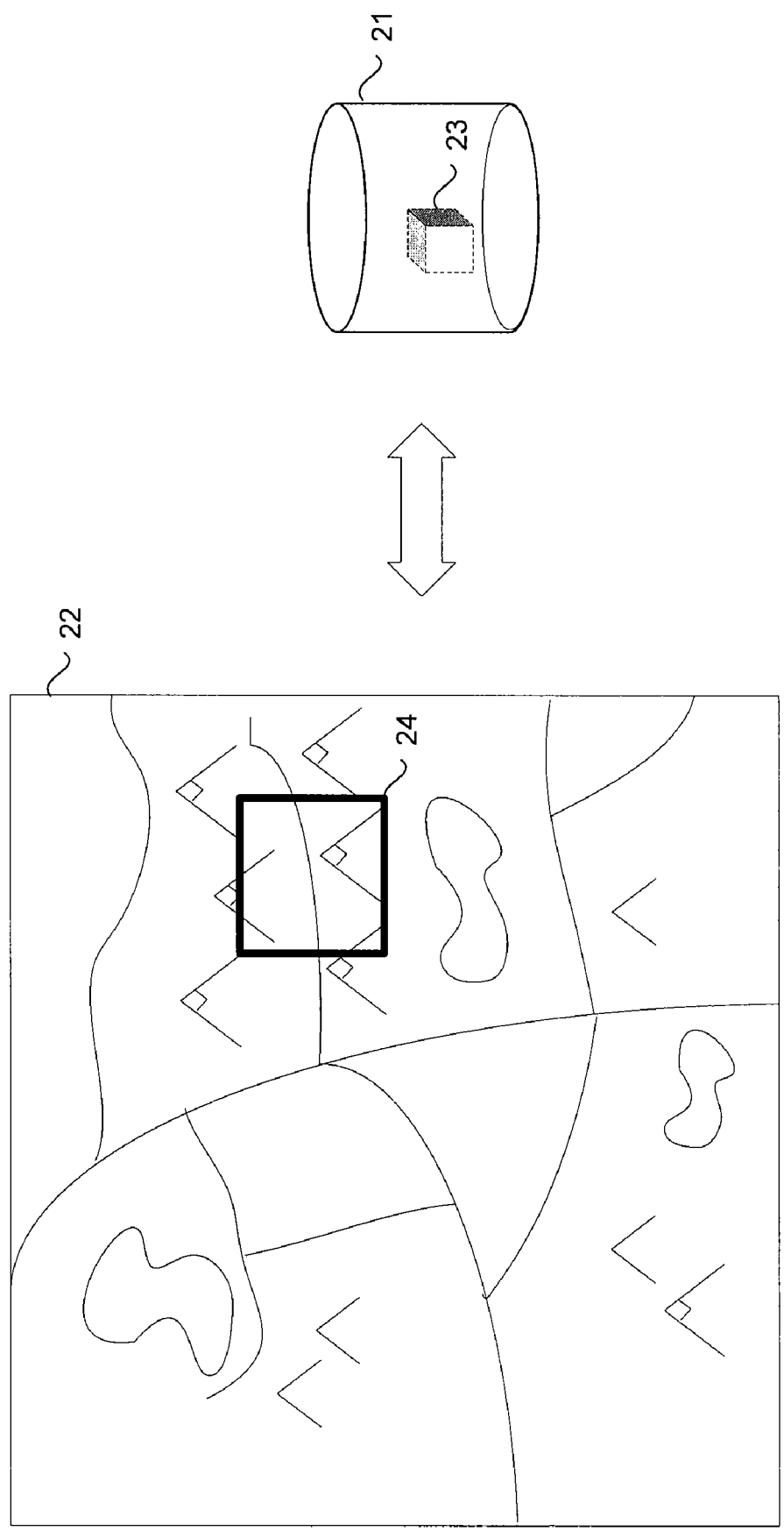
FIG. 2 shows a conceptual representation of a terrain database for use in a simulation.

FIG. 2 illustrates a representation of a terrain database that may be used during a large-scale simulation. The terrain database 21 contains data representing a geographic area (or volume) 22. However, in practice, it may be that only a subset 23 (less than all) of the data contain in the terrain database 21 can fit in working memory of any server 1 or client 2 together with the code and other data needed for the simulation. The subset 23 corresponds to a subset 24 of the geographic area 22 represented by the whole database 21. Hence, any objects being simulated by a machine which are outside the area 24 corresponding to the currently loaded subset 23 would have to be paused with conventional multi-user, multi-object simulation techniques. The technique introduced here solves this problem.

Figure 3:
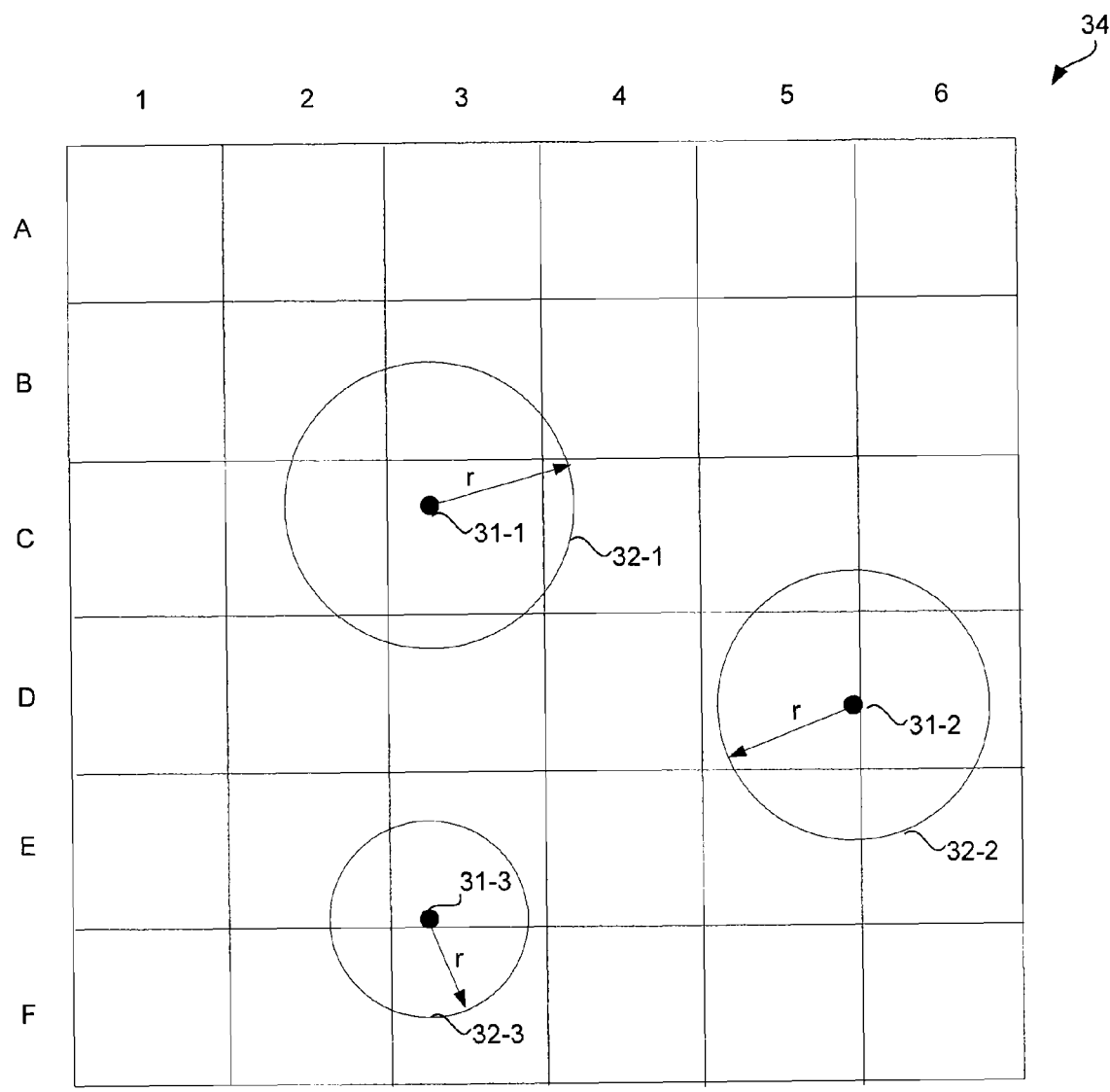
FIG. 3 shows a representation of a terrain database that has multiple terrain pages, with multiple objects having respective areas of interest superimposed thereon.

Referring to FIG. 3, a terrain database for simulation is divided into multiple subsets, called terrain "pages". Each terrain page is represented by a separate square on the illustrated grid. For purposes of explanation, a terrain page is referenced by letter and number, corresponding to its row-column position. The technique introduced here includes treating each object to be simulated as a separate center of focus, calculating an area of interest around each center of focus (object), and then simulating the objects by loading into working memory the terrain pages of the terrain database that overlap with at least one of the areas of interest, and not loading into the working memory terrain pages of the terrain database that do not overlap with at least one of the areas of interest. As such, any given server loads fewer than all of the pages of the terrain database at any given time.

The area of interest for any object 31 can be calculated as a sphere 32 (shown as circles in FIG. 3) of a given radius around the object. The radius, r, of such a sphere can be proportional to the maximum velocity, v, of the object 31 multiplied by the time it takes to load a new set of terrain pages from external storage into working memory. Calculating the radius of the area of interest in this manner is a simple way to enforce consistency, in the sense that terrain data will always be loaded before an entity interacts with the terrain. However, other functions for determining the distance away from entities to load terrain data (or to do clumping) can be used. Examples include a function of the maximum interaction distance of an entity (if known or determined), a function of current entity velocity and/or heading, a fixed, system-wide radius, or a combination of these and/or other variables.

Referring to FIG. 3, three separate centers of focus, 31-1, 31-2 and 31-3, corresponding to three separate objects, are shown, superimposed over a terrain database 34 according to their respective locations in the virtual world. Assume that only these three objects are simulated on a particular server. Objects 31-1, 31-2 and 31-3 have areas of interest 32-1, 32-2 and 32-3, respectively. Area of interest 31-1 overlaps terrain pages B2, B3, B4, C2, C3, C4, D2 and D3. Area of interest 31-2 overlaps terrain pages C5, C6, D5, D6, E5 and E6. Area of interest 31-3 overlaps terrain pages E2, E3, F2 and F3. Therefore, in a simple implementation according to the illustrated example, the server would have to load into its working memory only terrain pages B2, B3, B4, C2, C3, C4, D2, D3, C5, C6, D5, D6, E5, E6, E2, E3, F2 and F3 (a more sophisticated approach is described below), which is only 18 out of the 36 total (50%) terrain pages in the illustrated example. In a real example, the actual number of loaded terrain pages would likely be a much smaller fraction of the total number of pages in the terrain database. This represents a substantial savings in memory consumption compared to having to load the entire terrain database.

Figure 4:
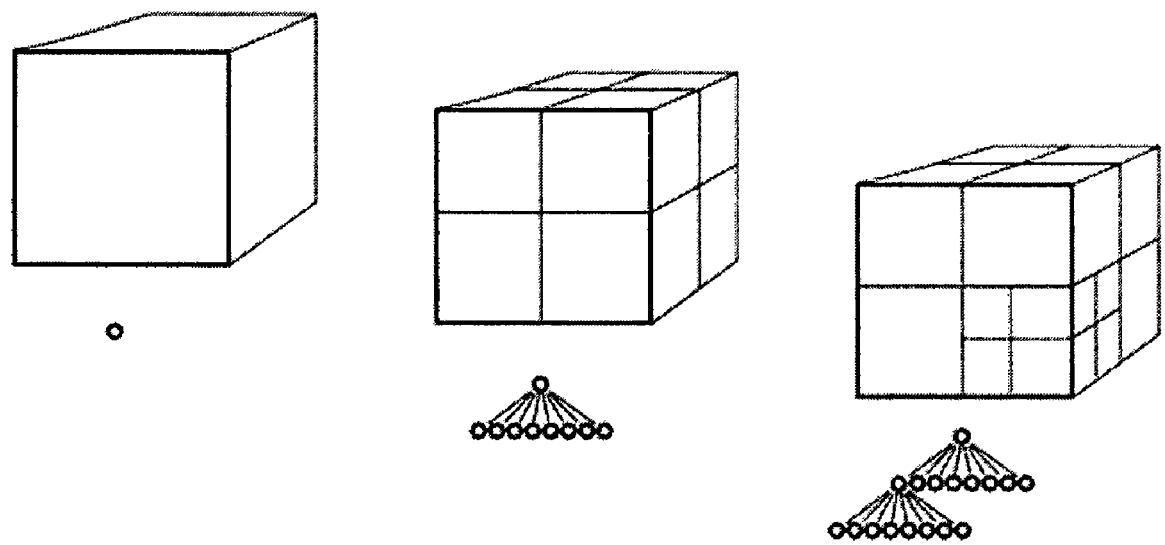
FIG. 4 conceptually illustrates an octree data structure.

This technique can be implemented, in part, by building a spatial index of the available terrain pages prior to run time, and then traversing that spatial index during runtime with the separate areas of interest as query parameters, to find the terrain pages to load. The spatial index can be implemented in the form of an octree, as illustrated in FIG. 4, and in particular, a "loose octree". As is well known in the computer arts, an octree is a recursive, hierarchical data structure suited for storing three-dimensional data (e.g., spatial data), where each node of the octree has eight child nodes, each child node mapping to a separate ⅛th of the volume of the parent node (split along the three cardinal planes). In FIG. 4, the middle cube shows how the left-hand cube can be divided into four cubes, and the right-hand cube shows how one of the nodes of the middle cube can be subdivided into four cubes, depending on spatial indexing needs.

In a "loose octree", as is also well known, the nodes are made "loose" by overlapping them. So for example, a node which in a normal octree would be bounded by an N×N×N cube, might instead be defined as being bounded by a 2N×2N×2N cube, overlapping with the neighboring nodes. An example of a loose octree tree technique is described in U.S. Pat. No. 7,002,571 of Lake et al.

Figure 5:
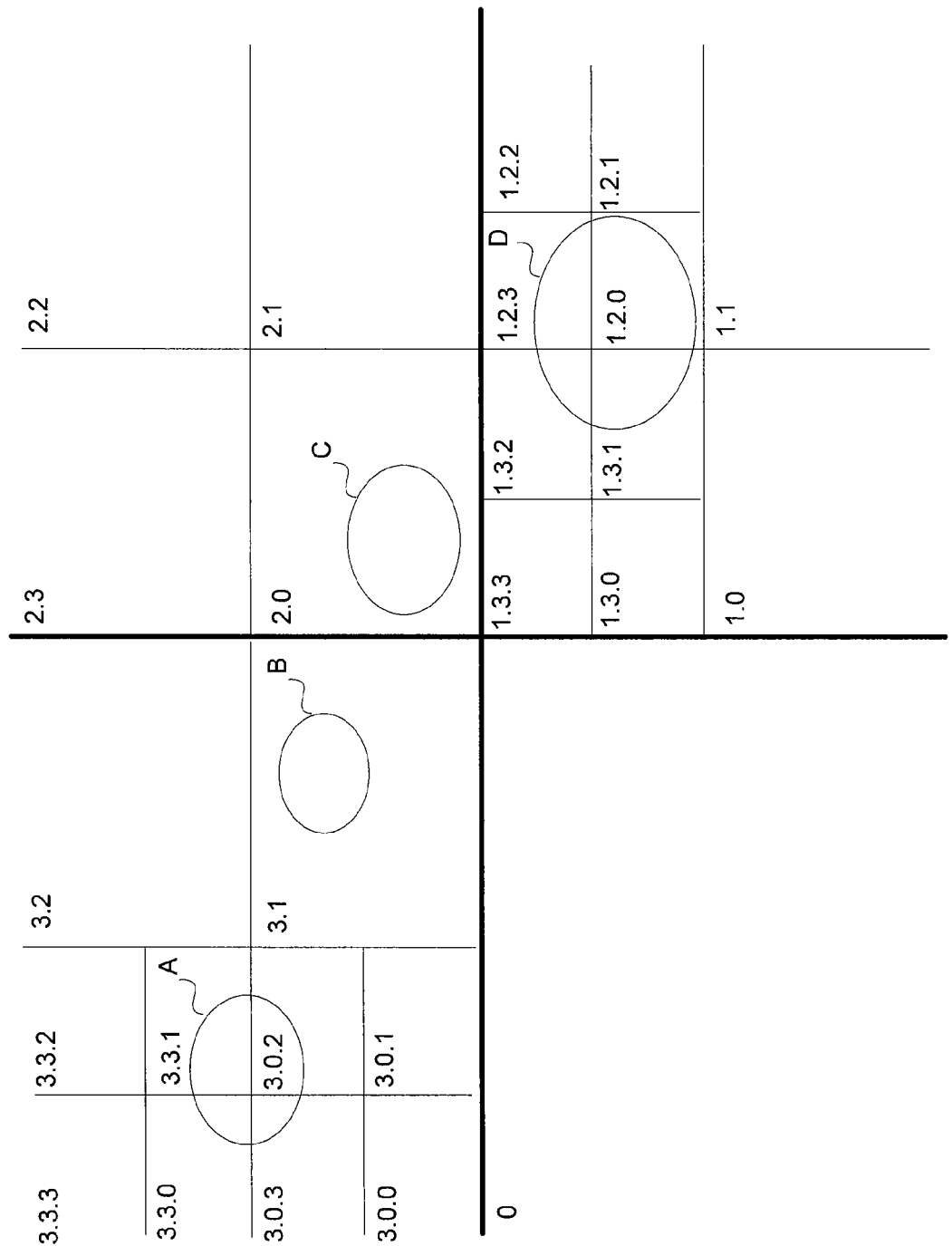
FIG. 5 illustrates, in two dimensions, an example of the spatial indexing of terrain files by using an octree.

FIG. 5 illustrates in 2D how the spatial index can index terrain data. The illustrated example schematically shows how four islands, A, B, C and D, can be represented using an octree. Each of the framed islands is stored in a separate physical file, which in turn contains the spatial index of the data in the file. In the top-level index file, only references to those island files are stored, together with last-modified dates for each file to allow partial revision of the overall terrain database.

Thus, in the top-level index file, the hierarchy of nodes {0, 1, 2, 3, 1.0, 1.1, 1.2, 1.3, 1.2.0, 1.2.1, . . . } would be stored, together with a reference to the files in some nodes. For example, a reference to the file for island D would be stored in nodes 1.2.0, 1.2.3, 1.3.1 and 1.3.2. Together with the reference, the last known modification date of the file, or other versioning information, would also be stored. In one embodiment, references to files are stored as an index inside the octree, and the actual filename and versioning information is stored out of line with the octree, in a separate table inside the actual file.

By contrast, the reference to the file for island B would be stored only in node 3.1, because the extent of that reference fits into a single node of sufficiently small size. In the 3D case, an external reference may be stored in up to eight nodes, if it crosses splitting planes pessimally and may be stored in only a single node if the extent is optimally aligned with the global octree grid.

In certain embodiments, the spatial index is stored separate from at least some of the terrain page data. Doing so allows the (smaller) index to be downloaded quickly over a network, and then the index can be used to determine which terrain pages to fetch for any given position of the simulated world. This allows a machine that does not have access to the full terrain database to optimize the amount of data it needs to download (transfer over a network) to be able to perform simulation in a given area. Additionally, because groups of related pages can be made available as separate entities over the network, incremental update of the terrain database can be implemented as replacement of only a subset of the pages of all of the database.

Further, information about available newer terrain data (e.g., version information) for a given area can be stored with the spatial index. A hierarchy of storage can then be constructed where all terrain data is available on one or more terrain database server machines, and simulation servers and clients can incrementally download only the interesting portions of that data, on demand. This approach leads to a large bandwidth savings and a simplified process of keeping all participating simulation nodes up to date with occasionally changing terrain databases.

Figure 6:
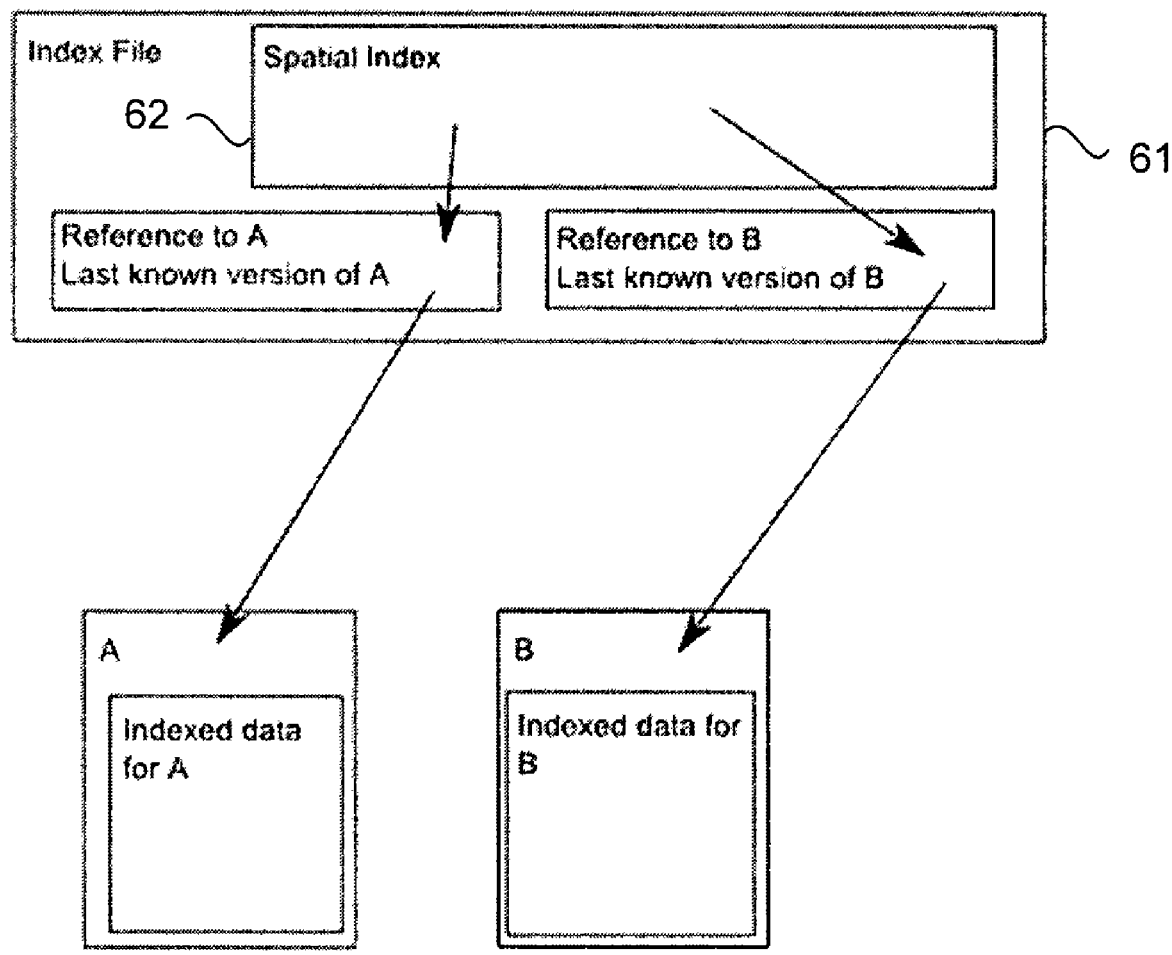
FIG. 6 illustrates how an index file containing a spatial index can be used to reference terrain data.

FIG. 6 shows an example in which there are three separate files, one index file 61 and two terrain data files, A and B. The index file includes the spatial index data 62 as well as separate references to data files A and B. Each reference to a data file also has associated with it version information indicating the last known version of the referenced data file.

Figure 7:
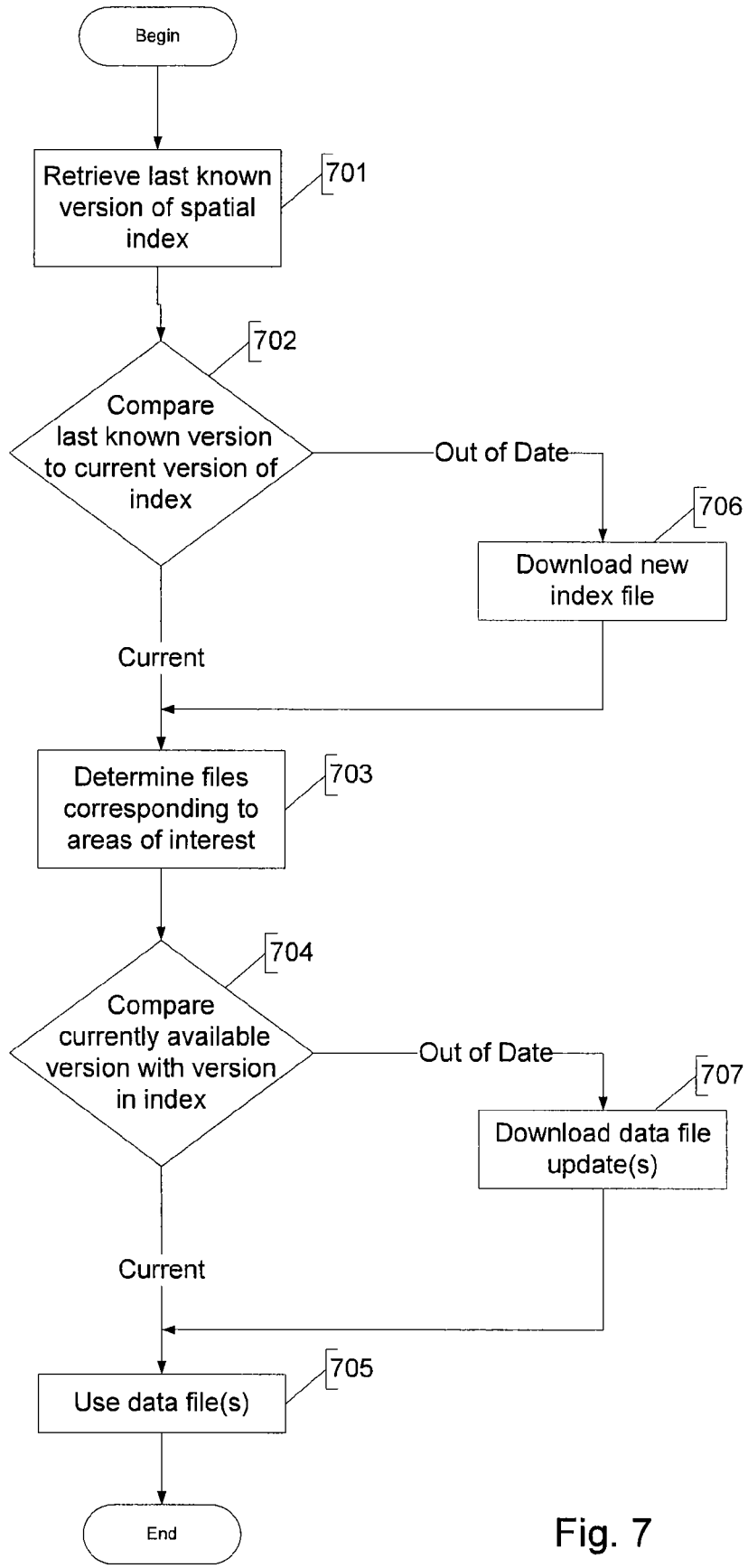
FIG. 7 is a flow diagram showing an example of a process for using versioning information in a spatial index.

FIG. 7 illustrates an example of how versioning information in the spatial index can be used on a client or a server for a simulation. Note that in practice, the spatial indexing can be done through more than one level of indirection, depending on size and complexity of the database. Initially, at 701 the process retrieves the last known version of the spatial index. At 702 the process then compares the version number of the last known version of the index to the version number of the current version of the index. If the last known version is determined to be current, the process proceeds to 703. If, on the other hand, the last known version is determined to be out of date, the process downloads a new index file at 706, and then continues to 703.

At 703 the process determines which terrain files correspond to the current areas of interest. At 704, for each such terrain file, the process then compares the version number of the currently available version with the version number of the version in the index. If the currently available version is determined to be current, the process proceeds to 705. If, on the other hand, the currently available version is determined to be out of date, the process downloads one or more terrain data file updates at 707, and then continues to 705.

Figure 8:
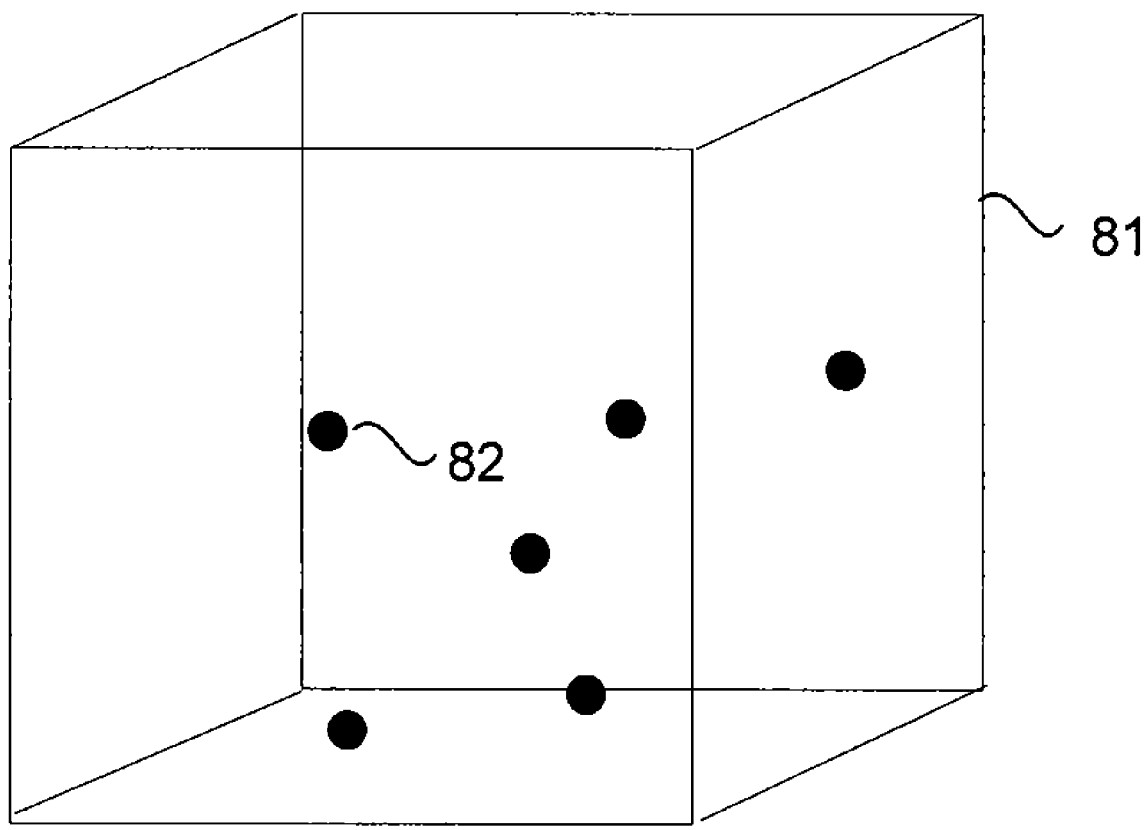
FIG. 8 illustrates a bounding volume for a cluster of objects in a simulation.

In certain embodiments, the objects simulated on a server are clustered by using a clustering algorithm. As illustrated in FIG. 8, a bounding volume 81 for each object cluster is constructed as a bounding axis-aligned box (a box is simpler to work with than a sphere when querying an octree) around the objects 82. The box defines an aggregate area of interest for the cluster. Any terrain pages that overlap with the aggregate area of interest are loaded into working memory. The dimensions and area (volume) of each bounding box can be based on the expected peak velocities of all of the objects in the cluster times the maximum loading time for terrain pages, as explained further below. The benefit of such clustering is that the traversal of the spatial index is significantly simplified, thus reducing CPU usage in determining which terrain pages to load, at the expense of being slightly conservative in loading terrain pages (and thus using more working memory than strictly necessary).

Figure 9:
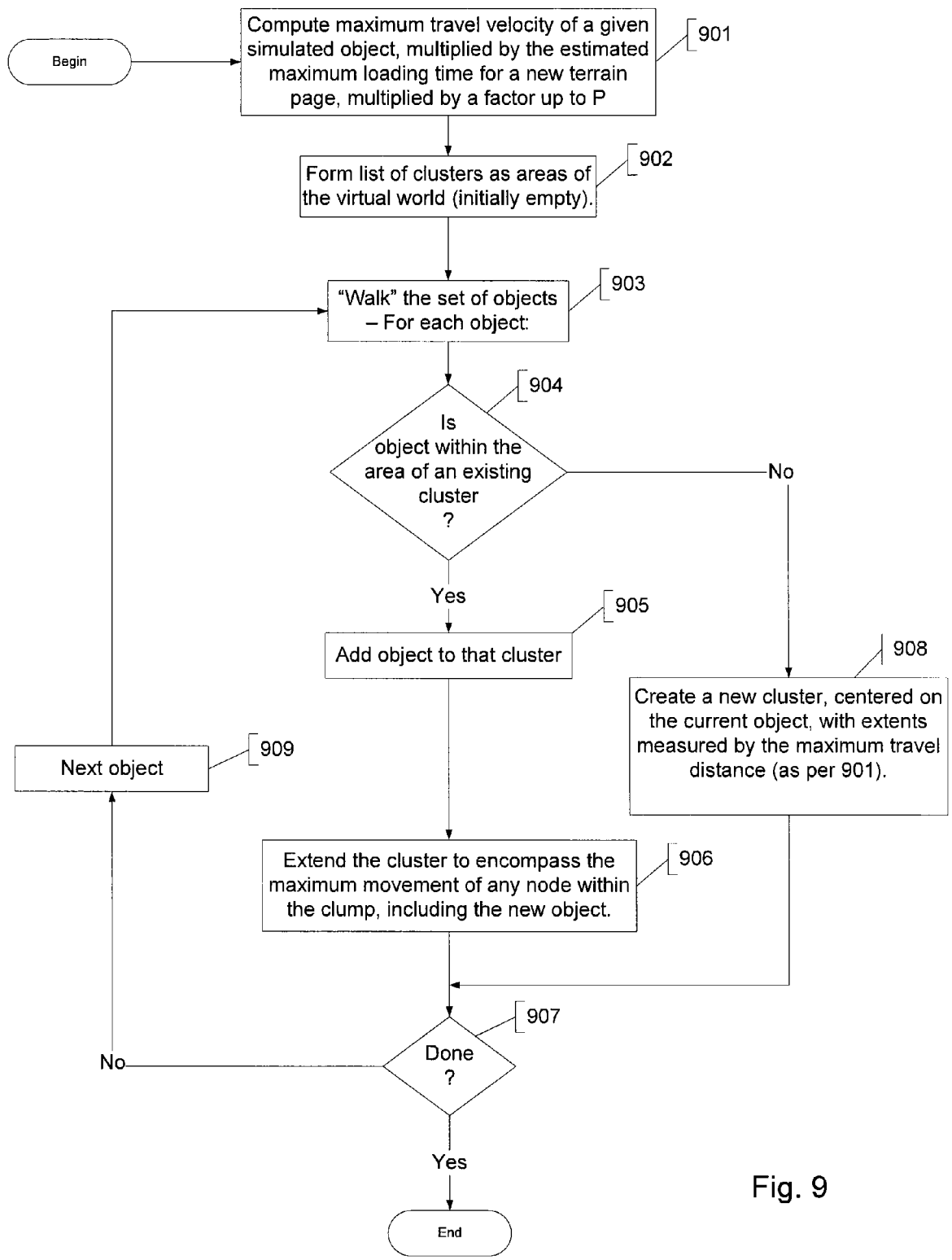
FIG. 9 is a flow diagram showing an example of a process for creating a clusters object.

FIG. 9 shows an example of an algorithm that may be used to form clusters of objects on a server during a simulation. Initially, at 901 the process computes the product of the maximum possible travel velocity of a given simulated object and the estimated maximum loading time for a new terrain page, multiplied by a factor of P (where up to P pages can be loaded simultaneously). The results is a distance measurement, which is the radius of the objects area of interest. The process then forms list of clusters as areas of the virtual world at 902 (initially this list is empty). Next, the process "walks" (examines) each object being simulated by the server in some arbitrary order (903). For each such object (903, 907, 909), the process determine at 904 whether the object is within the area of any cluster that already exists. If so, the process adds the object to that cluster at 905 and extends the cluster to encompass the maximum movement of any object within the cluster, including this new object, at 906.

Figure 10A:
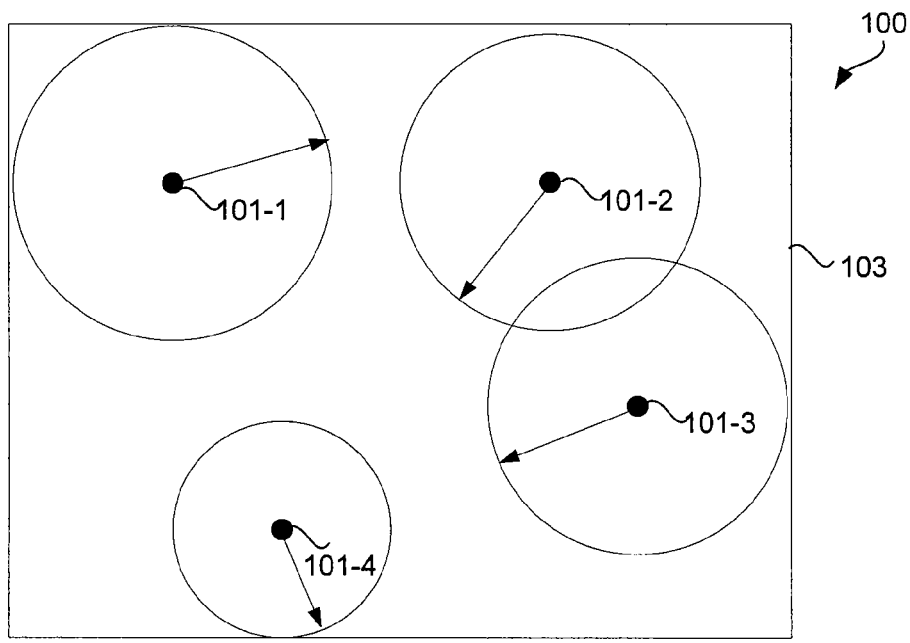
FIG. 10A illustrates a cluster of objects in a simulation, each having an area of interest.
Figure 10B:
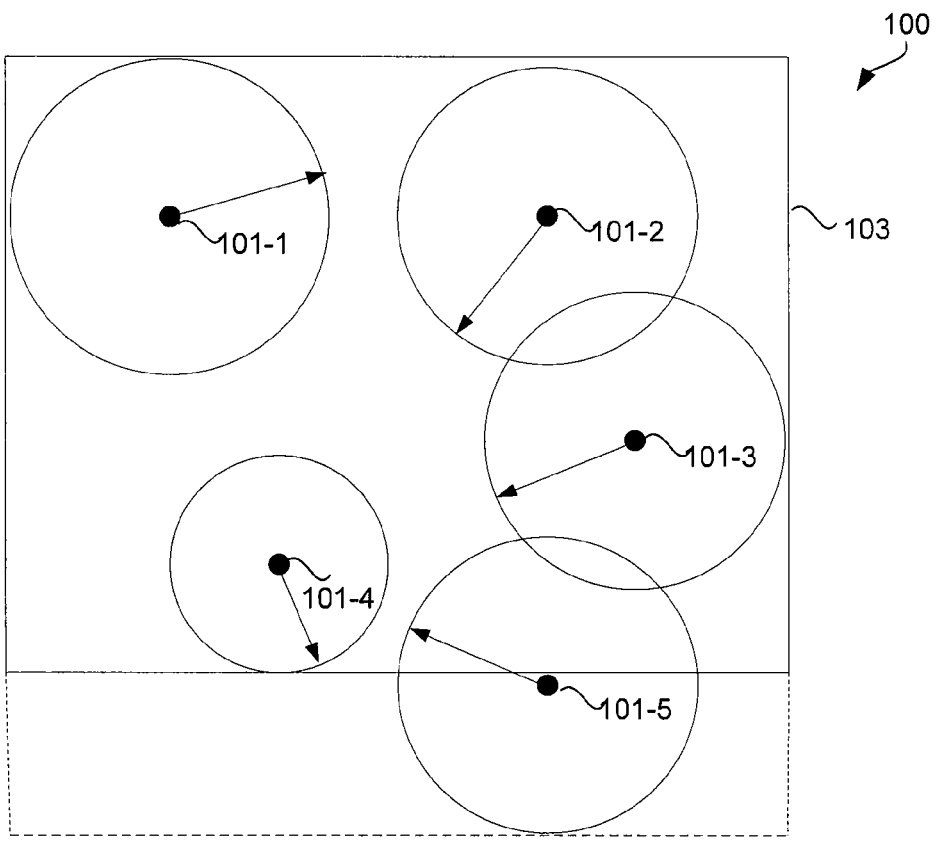
FIG. 10B illustrates a modification to cluster of objects after a new object has been added to the cluster.

FIGS. 10A and 10B illustrate the effect of adding an object to a cluster. Specifically, FIG. 10A shows a cluster 100 that initially includes four objects, 101-1, 101-2, 101-3 and 1-104. FIG. 10B shows in the cluster 100 being extended to accommodate the addition of a new object to the cluster, object 101-5. The lower boundary of the bounding volume 103 of the cluster is extended to encompass the area of interest 102 of the newly added object 101-5.

If the object being considered is not within the area of any existing cluster at 904, then the process goes to 908, where it creates a new cluster, centered on the object being considered, with extents measured by the maximum travel distance of the object (per 901). After 908, the process proceeds to 907, discussed above. Note that other algorithms for doing clustering can instead be used.

As an optimization, the needs of simulation (which does collision testing on pre-compiled collision data like binary space partitioning (BSP) trees or collision polygon meshes) can be separated from the needs of display (which needs visual assets such as texture images and display triangle meshes), allowing separate optimization of these different aspects. In a system in which the simulation is deterministic, only a single level of detail needs to be stored for collision testing. However, to take best advantage of available graphics hardware on high-end machines while scaling down to very low-level display systems (such as on handheld devices), a large number of different levels of detail of the visual data can be precalculated and stored. Based on where all the simulation entities are, collision data is then loaded into working memory as described above (i.e., based on areas of interest), whereas visual data is loaded into working memory based on where the (virtual) camera is (i.e., the traditional "camera location" method). Combining these two methods allows one to optimize separately for the separate use cases (collision/simulation versus display).

In any real-time (or near-real-time) simulation system, it is desirable not to block the main simulation thread when waiting for specific input/output (I/O), such as waiting for terrain pages to load. Such a stop-and-wait implementation would not be able to progress the simulation at the required rate, because it would stop and wait for terrain pages whenever objects move to intersect with new pages. In such a system, speculative preloading of terrain pages that might be needed soon can be used, even if they are not currently needed by any simulated object. If the maximum speed of an object is known, and the maximum latency of making a terrain page resident is known, then an area of interest can be calculated, within which any terrain page is preloaded into working memory, to be able to serve collision queries without stalling the simulation thread. The extent of this area is a radius around each object, where the distance of the radius is the maximum possible velocity of that object times the maximum latency of loading the necessary terrain pages. In one embodiment, the simulation thread continually notifies a separate thread of execution, responsible for loading terrain pages into working memory, of the position and velocity of each object in the simulation (or of each cluster of objects). The terrain loading thread can then load the necessary pages in sufficient time in advance of when they will be necessary, to avoid stalling the simulation. Note that if the exact values of any parameters are not known and/or cannot be determined, such as the maximum time to load a terrain page, estimates can be used, where the degree of simulation fidelity will be affected by how conservative those estimates are.

Figure 11:
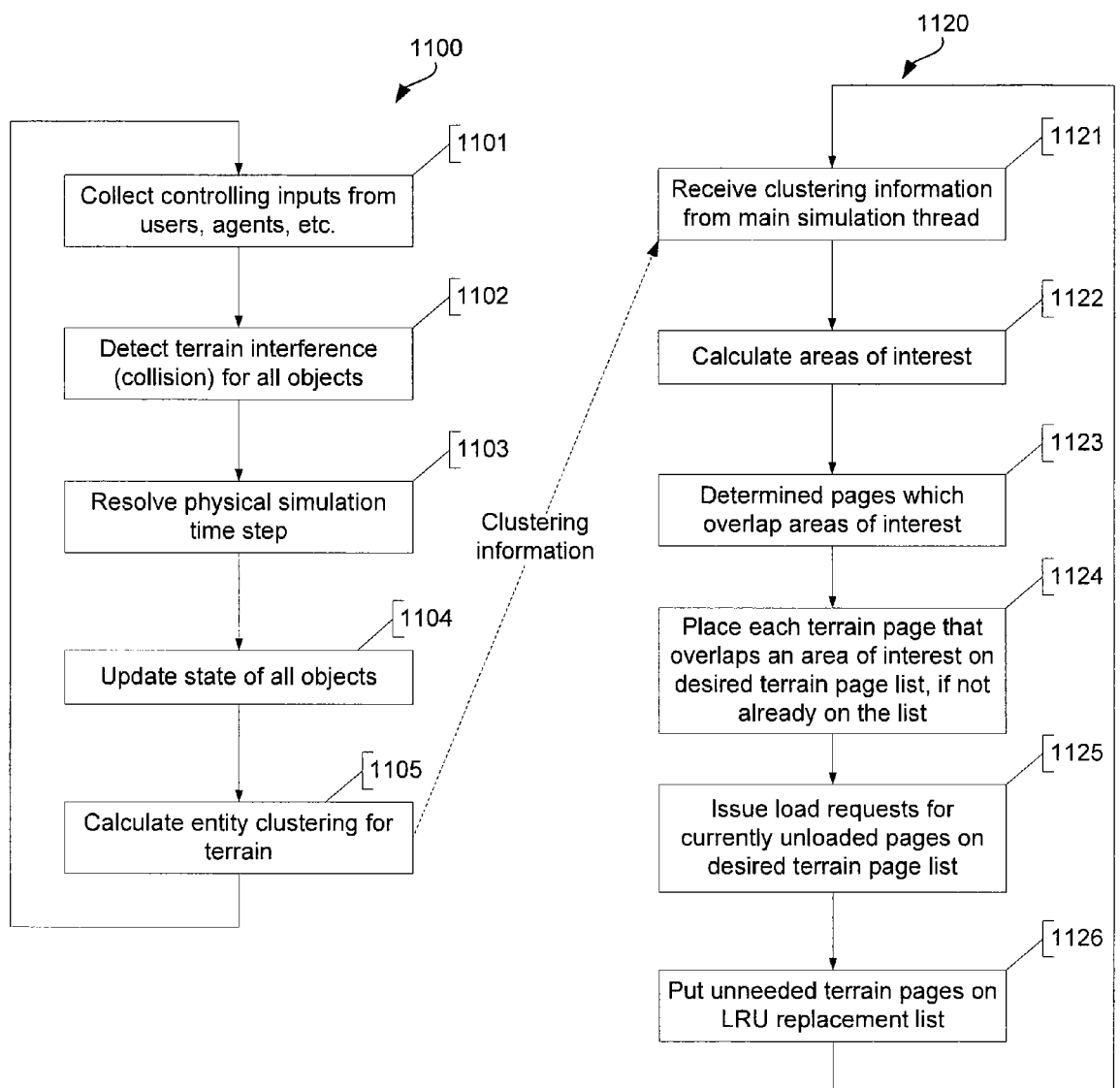
FIG. 11 illustrates an example of a main simulation thread and a terrain page loading thread, executing in parallel.

FIG. 11 illustrates an example of two threads of execution, namely, a main simulation thread and a terrain page loading thread, which ca execute in parallel. The main simulation thread 1100 is as follows. Initially, at 1101 the thread collects controlling inputs from participating users, software agents and/or other entities. At 1102 the thread then detects terrain interference (i.e. collision) for all simulated objects known to the thread. At 1103 the thread resolves the next physical simulation time step; that is, it advances the states of objects according to their current velocities, directions and other aspects of their state. The main simulation thread then updates the state of all objects known to it at 1104. At 1105, the thread calculates entity clustering for the terrain, which may be done according to the process in FIG. 9. The result of this operation is a set of clustering information, i.e., information which defines one or more object clusters. This information is continually provided to the terrain page loading thread 1120. The simulation thread then loops back to 1101 and repeats.

The terrain page loading thread 1120 begins at 1121 with receiving the clustering information from the main simulation thread 1100. Next, at 1122 the terrain page loading thread calculates the areas of interest of each object known to it. The thread then determines which pages of the terrain database overlap those areas of interest at 1123. At 1124 the terrain page loading thread places each terrain page that overlaps at least one area of interest on a "desired terrain pages" list, assuming such page is not already on the list. The thread then issues load requests at 1125 for any terrain pages on that list that are currently unloaded. Finally, the thread puts any unneeded terrain pages that are currently loaded in working memory on the LRU replacement list, to be replaced in cache when appropriate. The terrain page loading thread 1120 then loops back to 1121 and repeats.

When introducing new entities into the simulation, some new terrain area that is not currently loaded into working memory may suddenly become required. In the case of asynchronous terrain loading, this occurrence presents a problem. Assume that an avatar in a virtual world logs out when standing on a bridge. The avatar later logs in again, in the same location. If there are no other entities near that bridge, the bridge may have gotten unloaded by the simulation server responsible for that area of the simulated world. There is a possible race condition where the avatar logs in and one or more terrain pages, meshes or other areas are queued, but the simulation will let the avatar fall through the air until the load actually completes, meaning the bridge will "pop" into the virtual world, intersecting the avatar or even above the avatar, depending on how far the avatar falls before the asynchronous load completes.

To avoid this problem, an additional mechanism can be inserted into the terrain paging system, which allows a simulation server to query for which specific terrain areas are loaded. The simulation server can then queue a load for a new entity as the entity appears outside of the currently active terrain areas, and then defer instantiation of the new entity until the server knows that the terrain for the area in the neighborhood of the new entity is positively loaded into the simulation's working memory.

Figure 12:
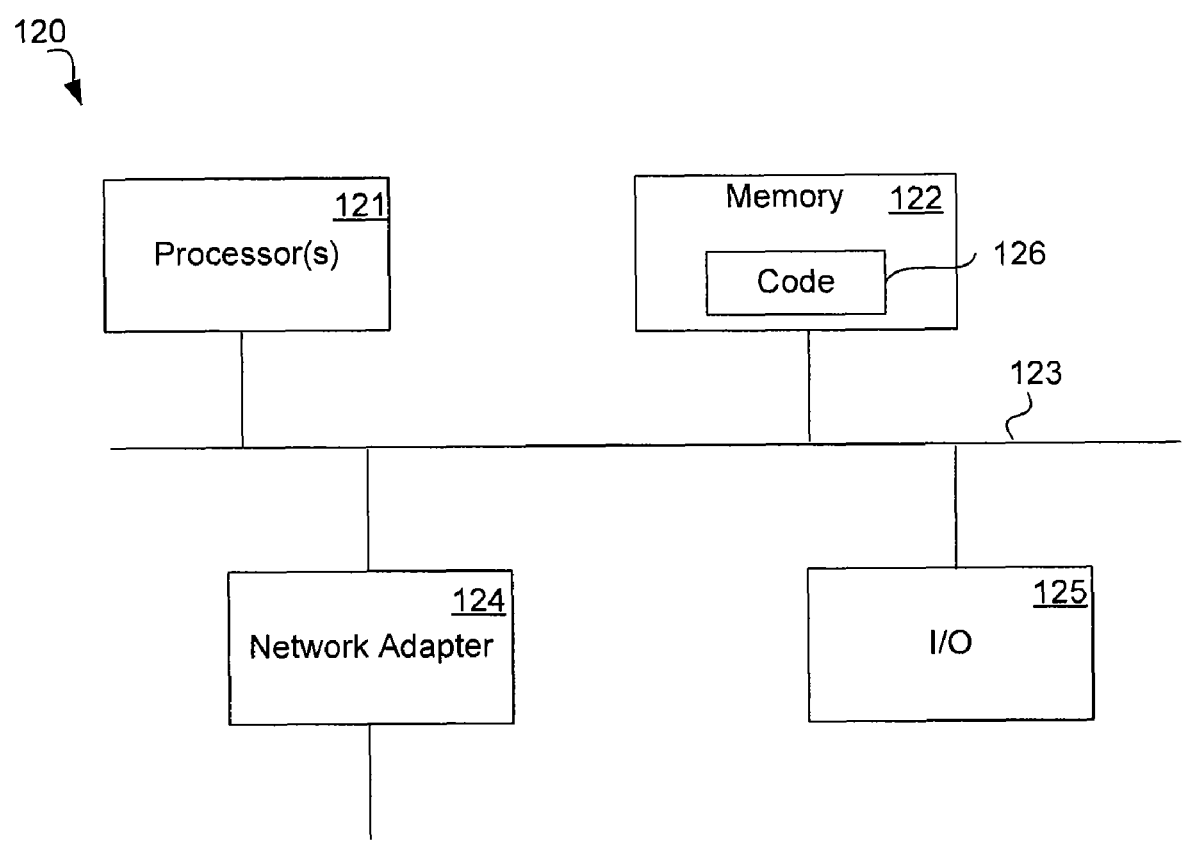
FIG. 12 is a high-level block diagram of a processing system that can implement the techniques introduced herein.

FIG. 12 is a high-level block diagram of a processing system that can represent any of the machines discussed above, such as a server 1 or client 2, which can implement the techniques introduced above. The processing system 120 includes one or more processors 121 and memory 122 coupled to an interconnect 123. The interconnect 123 shown in FIG. 12 is an abstraction that represents any one or more separate physical buses, point-to-point connections, or both connected by appropriate bridges, adapters, and/or controllers, etc. The interconnect 123, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 121 may include central processing units (CPUs) of the processing system 120 and, thus, control the overall operation of the processing system 120. In certain embodiments, the processor(s) 121 accomplish this by executing software or firmware stored in memory 122. The processor(s) 121 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 122 can be or include any form of random access memory (RAM), read-only memory (ROM), flash memory, or the like, or a combination of such devices. The memory 123 can be or include the working memory of processing system 120. In use, the memory 122 may contain, among other things, code 126 (software, firmware and/or data) embodying the techniques introduced above.

Also connected to the processor(s) 121 through the interconnect 123 are a network adapter 124 and, at least in the case of a client 2, one or more input output (I/O) devices 125. The network adapter 124 provides the processing system 120 with the ability to communicate with remote machines over the network 3 and may be, for example, an Ethernet adapter or Fibre Channel adapter. The one or more I/O devices 125 can include, for example, a monitor (display device), audio speakers, a keyboard, a pointing device (e.g., mouse, trackball, touchpad, joystick, etc.), a simulation input device (e.g., a game controller), or the like.

Note that some of the above-mentioned components of the processing system may not be present in certain embodiments, and certain embodiments may include components not mentioned here. For example, a server does not necessarily require I/O devices other than the network adapter 124.

Thus, a technique for managing and dynamically loading multiple sections ("pages") of a terrain database in a way that is adaptive to load, on a server computer has been described.

The techniques introduced above can be implemented in software and/or firmware in conjunction with programmable circuitry, or entirely in special-purpose hardwired circuitry, or in a combination of such embodiments. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
  calculating an area of interest for each of a plurality of objects to be simulated during a distributed simulation in which a plurality of computer systems operated by a plurality of users participate over a network, to produce a plurality of areas of interest;
  partitioning the plurality of objects into clusters of geographically proximate objects, wherein forming clusters includes:
    computing a distance measurement for each object that is a product of a maximum travel velocity of each object and an estimated time for loading a new terrain page multiplied by a factor of P, wherein P is a maximum number of terrain pages that can be simultaneously loaded, the distance measurement defining the area of interest as radius from the object;
    defining a boundary of one or more clusters;
    determining if the area of interest of each of the plurality of objects is within the boundary of one of the one or more clusters;
  calculating an aggregate area of interest for each said one or more clusters of geographically proximate objects, wherein calculating an aggregate area of interest for each of the one or more clusters comprises calculating an aggregate area of interest for a cluster of objects as a function of peak velocity over a period of time of the object with the highest peak velocity within the cluster; and
  loading into a working memory those terrain pages from a terrain database that overlap with the aggregate area of interest for a predetermined cluster of geographically proximate objects;
  simulating each of the plurality of objects in a computer system in association with the terrain database by using the terrain pages, wherein the terrain database is too large to fit into the working memory of the computer system together with code and data needed for the simulation.

2. A method as recited in claim 1, wherein simulation of each of the plurality of objects is not required to be paused on the computer system due to any memory constraint associated with the terrain database.

3. A method as recited in claim 2, wherein each of the plurality of users controls an object of the plurality of objects.

4. A method as recited in claim 2, wherein said loading of terrain pages into the working memory is performed asynchronously from a main simulation process of the simulation.

5. A method as recited in claim 2, further comprising:
  storing a spatial index of terrain pages that are available for loading, the spatial index being implemented as a recursive tree of bounding volumes;
  wherein said loading of terrain pages into the working memory comprises using the spatial index.

6. A method as recited in claim 5, further comprising:
  storing the spatial index outside of the working memory, separately from at least some of the terrain pages;
  identifying terrain pages which are proximate to current aggregate areas of interest of the objects, based on the spatial index; and
  transferring to the computer system only those terrain pages which are proximate to the current aggregate areas of interest of the objects.

7. A method as recited in claim 2, further comprising:
  receiving a request to introduce a new entity into a virtual world of the simulation; and in response to the request to introduce the new entity into the simulation, adding terrain area in a neighborhood of the new entity to an asynchronous load queue, and deferring instantiation of the new entity in the virtual world until said terrain area has completed loading into the working memory.

8. A method as recited in claim 2, further comprising:

keeping in the working memory a terrain page that does not currently overlap with a set of active objects.

9. A method as recited in claim 2, further comprising:

keeping a budget of system resources allocated to terrain pages;

for each of the terrain pages, calculating an amount of the budget which the terrain page consumes; and using a queue of terrain pages that do not currently overlap an aggregate area of interest to determine which pages to unload from the working memory to comply with the budget.

10. A method as recited in claim 2, further comprising:

keeping a list of areas of interest of the objects; and loading a terrain page that does not currently but it is determined may overlap an area of interest into the working memory, even if that terrain page does not overlap an area of interest of any currently active object.

11. A method as recited in claim 10, further comprising:

keeping a history of historical usage patterns of areas of interest of objects; and using the history to determine if a terrain page may overlap with areas of interest.

12. A method as recited in claim 1, wherein calculating an aggregate area of interest for each cluster of objects comprises calculating the area of interest for the cluster of objects as a function of latency of loading terrain pages that have not previously been loaded.

13. A processing system comprising:

a processor;

a network communication device to enable the processing system to communicate with a plurality of computers over a network during a distributed simulation in which the processing system and the plurality of computers operated by a plurality of users participate;

a working memory to store code and data needed for the simulation; and a storage medium storing code which, when executed by the processor, causes the processing system to perform operations including accessing a terrain database that has a plurality of terrain pages, wherein the terrain database is too large to fit in the working memory together with the code and data needed for the simulation;

calculating an area of interest for each of a plurality of objects to be simulated, to produce a plurality of areas of interest;

partitioning the plurality of objects into clusters of geographically proximate objects, wherein forming clusters includes:

computing a distance measurement for each object that is a product of a maximum travel velocity of each object and an estimated time for loading a new terrain page multiplied by a factor of P, wherein P is a maximum number of terrain pages that can be simultaneously loaded, the distance measurement defining the area of interest as radius from the object;

defining a boundary of one or more clusters;

determining if the area of interest of each of the plurality of objects is within the boundary of one of the one or more clusters;

calculating an aggregate area of interest for each said one or more clusters of geographically proximate objects, wherein calculating an aggregate area of interest for each of the one or more clusters comprises calculating an aggregate area of interest for a cluster of objects as a function of peak velocity over a period of time of the object with the highest peak velocity within the cluster; and loading into the working memory those terrain pages from the terrain database that overlap with the aggregate area of interest for a predetermined cluster of geographically proximate objects, such that the number of loaded terrain pages is smaller than the total number of terrain pages in the terrain database; and simulating the plurality of objects by using the terrain pages loaded into the working memory, wherein each of the plurality of users controls an object of the plurality of objects, and wherein simulation of each of the plurality of objects is not required to be paused on the processing system due to any memory constraint associated with the terrain database.

14. A processing system as recited in claim 13, wherein said loading of terrain pages into the working memory is performed asynchronously from a main simulation process of the simulation.

15. A processing system as recited in claim 13, wherein calculating an aggregate area of interest for each cluster of objects comprises calculating the area of interest for the cluster of objects as a function of latency of loading terrain pages that have not previously been loaded.

* * * * *